No. 745,994. PATENTED DEC. 8, 1903.
G. E. BENTON.
TWINE CUTTER.
APPLICATION FILED AUG. 12, 1903.
NO MODEL.
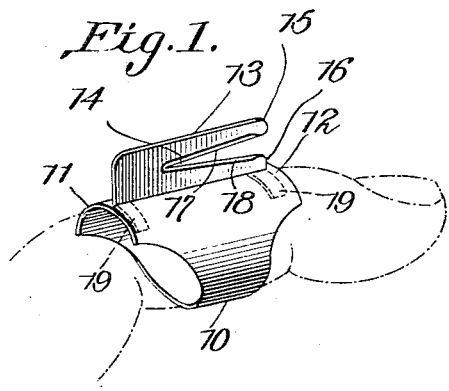
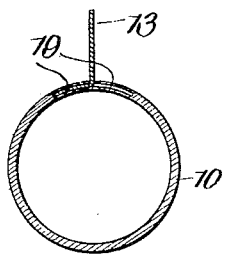
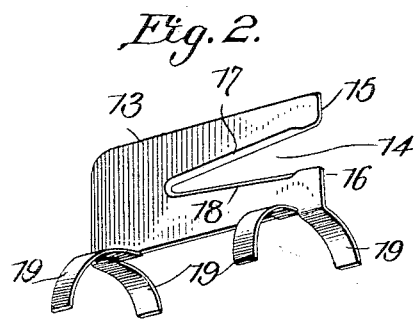
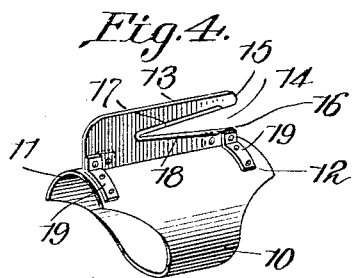
Witnesses
E. S. Stewart
C. N. Woodward
George E. Benton, Inventor.
by C. A. Snow & Co
Attorneys No. 745,994. Patented December 8, 1903.

UNITED STATES PATENT OFFICE.

GEORGE EDWARD BENTON, OF EAST HAMPTON, NEW YORK.

TWINE-CUTTER.

SPECIFICATION forming part of Letters Patent No. 745,994, dated December 8, 1903.

Application filed August 12, 1903. Serial No. 169,292. (No model.)

*To all whom it may concern:*

Be it known that I, GEORGE EDWARD BENTON, a citizen of the United States, residing at East Hampton, Long Island, in the county of Suffolk and State of New York, have invented a new and useful Twine-Cutter, of which the following is a specification.

This invention relates to implements for severing twine, thread, and the like, and has for its object to produce a simply-constructed and easily-operated implement capable of detachable connection to one of the fingers and by which twine, thread, or the like may be quickly severed; and the invention consists in certain novel features of construction, as hereinafter shown and described, and specified in the claims.

In the drawings illustrative of the invention, in which corresponding parts are denoted by like designating characters, Figure 1 is a perspective view of the implement. Fig. 2 is an enlarged perspective view of the cutting-blade detached. Fig. 3 is a transverse section, enlarged, of the structure shown in Fig. 1. Fig. 4 is a view similar to Fig. 1, illustrating a modification in the construction of the cutting-blade and supporting-band.

This invention is intended for use upon one of the fingers of persons who use twine, thread, and similar articles to enable them to quickly sever the same without loss of time or interference with the ordinary uses of the hands or fingers, and consists of a band or ring 10, of any suitable material, but preferably of pressed paper, leather, or compounds of leather-like material, celluloid, or similar material, formed to fit one of the fingers and preferably with elongations 11 12 longitudinally thereof, as shown. The bands 10 will be produced in graded sizes to fit different-sized fingers.

The cutting-blade is indicated as a whole by 13 and is attached longitudinally of the band on the side containing the elongations 11 12 and formed with a longitudinal V-shaped cavity 14, with the outer ends 15 16 rounded and the inner portions of the inclined sides of the cavity formed with knife-edges 17 18, as shown. By this arrangement it will be noted the cutting-surfaces extend a portion only of the length of the sides of the cavity and stop short of the rounded ends 15 16, so that no danger exists of the sharpened or cutting edges coming in contact with the clothing or other portions of the hands or with articles of goods being handled. The rounded ends 15 16 enable the blade to slip harmlessly over articles with which it accidentally comes in contact and becomes effective only when the operator purposely places the outer portion 15 beneath the twine to be severed and draws the cutting edges over it. By this simple means a very safe device is produced, which becomes effective only when the operator purposely manipulates it to bring the cavity 14 into operative relations to the twine or thread to be severed.

Extending from the lower edge of the blade 13 are spaced projections 19, which may be integral with the blade, as in Figs. 1 and 2, or attached thereto, as in Fig. 4. The projections 19 extend in opposite directions and form means for the attachment of the blade to the band, as illustrated.

The projections 19 may be embedded in the material of the band, as in Figs. 1 and 3, or riveted or otherwise connected, as in Fig. 4; but these modifications will not be a departure from the principle of the invention, as the same results are produced in substantially the same manner.

When the material employed for the band member 10 will admit of such action, the portions 19 will be molded into the body of the band when the latter is formed, which will produce a very simple, cheap, and durable device, which will be the preferable means of construction.

The elongations 11 12 firmly support and maintain the cutting-blade in position and effectually prevent any tilting movement thereto when in action.

Having thus described my invention, what I claim is—

1. As a new article of manufacture, a twine-cutting implement consisting of a band for attachment to a finger and formed of material capable of being molded or pressed into shape, and a cutting-blade formed with a longitudinal cavity having opposing cutting edges and with lateral projections adapted for embedding into the material of the band, substantially as described.

2. A twine-cutter comprising a finger-band having a blade arranged transversely thereof, said blade having a V-shaped recess formed longitudinally therein with the edges thereof sharpened and terminating short of the outer ends thereof, said ends being rounded.

In testimony that I claim the foregoing as my own I have hereto affixed my signature in the presence of two witnesses.

GEORGE EDWARD BENTON.

Witnesses:
JOSEPH S. OSBORNE,
MARY M. SWAIN.